Nov. 24, 1936.　　　P. O. THOMPSON　　　2,062,197
DETACHABLE SWEEP BLADE
Filed Oct. 14, 1935
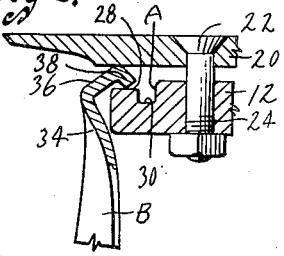
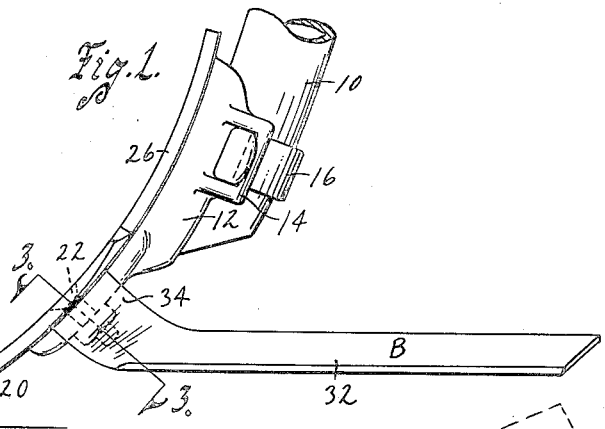
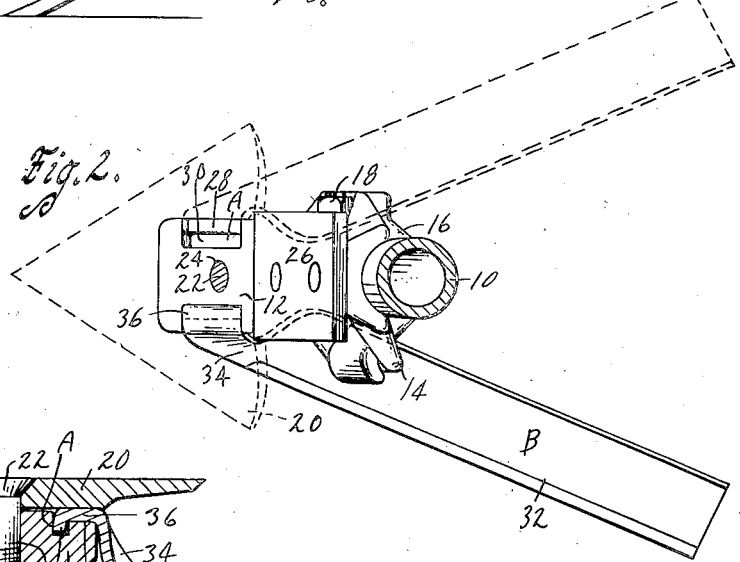
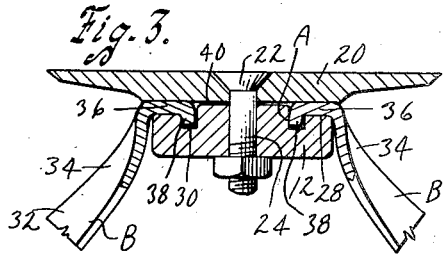
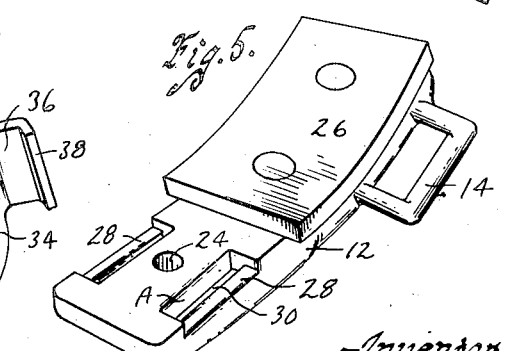
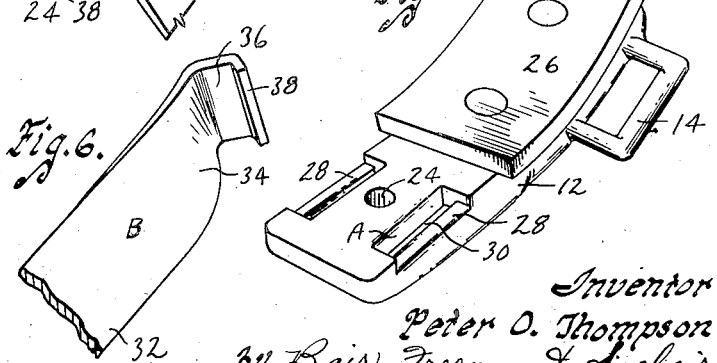
Witness
H. S. Wurzenmaier
Inventor
Peter O. Thompson
by Bair, Freeman & Sinclair
Attorneys Patented Nov. 24, 1936

2,062,197

UNITED STATES PATENT OFFICE 2,062,197

DETACHABLE SWEEP BLADE

Peter O. Thompson, Perry, Iowa

Application October 14, 1935, Serial No. 44,939

14 Claims. (Cl. 97—205)

An object of my invention is to provide sweep blades which are readily attachable to and detachable from a cultivator shovel in a minimum of time without the necessity or removing any bolts or other fastening or clamping means.

A further object is to provide in combination with a cultivator shovel, a special type of bracket which can support either the shovel alone or sweep blades in addition to the shovel when desired.

Another object is to provide individual sweep blades, one for each side of the cultivator shovel which so coact with the bracket and shovel that they can be readily attached to or detached from the shovel after clamping means for the shovel has been slightly loosened.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a side elevation of a cultivator shovel with my improved sweep blades attached thereto.

Figure 2 is a plan view of the same showing one of the sweep blades and the cultivator shovel in dotted lines.

Figure 3 is a sectional view on the line 3—3 of Figure 1 illustrating the coaction of the forward ends of the sweep blades with the bracket and shovel for retaining the sweep blades rigidly connected therewith.

Figure 4 is a view similar to a portion of Figure 3 showing the parts being connected or disconnected.

Figure 5 is a perspective view of the mounting bracket for the cultivator shovel and sweep blade; and Figure 6 is a perspective view of the forward end of the sweep blade showing its shape for coaction with the bracket of Figure 5.

On the accompanying drawing, I have used the reference numeral 10 to indicate the shank of a cultivator. A bracket 12 is adapted for attachment thereto in any desired manner. On the drawing I show a bail 14 into which one end of the clamp yoke 16 is hooked, the other end being drawn up by a bolt 18 to clamp the members 12 and 16 about the front and back of the shank 10 as best shown in Figure 2.

Clamped against the upper face of the bracket 12 is a cultivator shovel 20, the means of clamping comprising a counter-sunk bolt 22 extending through the upper end of the shovel and through an opening 24 formed in the bracket 12. At 26 I show a cultivator shovel extension, the lower edge of which is engaged by the upper edge of the shovel 20 to prevent rotation of the shovel relative to the bracket 12.

The bracket 12 has formed therein on opposite sides of the bolt opening 24, a rabbet A. Each rabbet A comprises a shallow portion or notch 28 and a deeper or groove like portion 30.

I provide a sweep blade B for each rabbet A. Each sweep blade B comprises a cultivating portion 32 having the usual sharpened front edge and a front end bending upwardly and slightly twisted at 34, extending laterally at 36 and extending downwardly at its terminal end in the form of a tongue 38.

The blades B are adapted for mounting in the manner shown in Figure 3 with the tongues 38 in the grooves 30 and the portions 36 extending outwardly through the portions 28 of the rabbets A. It will be noted that there is a slight space between the shovel 20 and the upper surface of the bracket 12 in Figure 3, indicated at 40, so that when the bolt 22 is tightened the portions 36 of the sweep blade are tightly clamped between the bracket 12 and the cultivator shovel and are thus rigidly held in a predetermined position relative to the bracket and cultivator shovel.

When it is desired to detach the sweep blades for removing or changing them, the bolt 22 is loosened as in Figure 4, whereupon the front ends of the sweep blades can be disconnected from the bracket by a downward swinging movement of the blades. The forward ends can thus be quickly detached without the necessity of having to entirely remove the bolt 22.

Likewise, for attaching the sweep blades the bolt can be loosened and the blades swung to position and then when the bolt is tightened the blades are retained against swinging and removal relative to the bracket and shovel.

The tongue and groove connection being other than round, or elongated, as illustrated, prevents rotation of the sweep blade in the rabbet A, as well as provides an interlocking connection preventing removal of the blade when the bolt 22 is tightened. When the sweep blades are not used, then the cultivator shovel is tightened against the upper face of the bracket 12 eliminating the space at 40 and thus providing a rigid connection of the shovel to the bracket whether the sweep blades are used or not.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. In combination with a cultivator shovel, a bracket for mounting the same on a cultivator shank, said shovel being bolted against the upper surface of said bracket, said bracket having a pair of other than round sockets in said upper surface and recesses extending from said sockets to the edges of said bracket and a sweep blade for each socket having a portion received and fitting therein and a portion extending therefrom through said recesses.

2. In combination with a cultivator shovel, a bracket for mounting the same on a cultivator shank, said shovel being bolted against the upper surface of said bracket, said bracket having a pair of other than round sockets in said upper surface spaced on opposite sides of the bolt, and recesses extending from said sockets to the edges of said bracket and a sweep blade for each socket having a portion received and fitting therein and a portion extending therefrom through said recesses.

3. In combination with a cultivator shovel, a bracket for mounting the same on a cultivator shank, said shovel being bolted against the upper surface of said bracket, said bracket having a pair of rabbets, one on each side of the bolt and a sweep blade for each rabbet having its forward terminal end extending into the rabbet and clamped between the bolt thereof and said cultivator shovel when the bolt is tightened.

4. In combination with a cultivator shovel, a bracket for mounting the same on a cultivator shank, said shovel being bolted against the upper surface of said bracket, said bracket having a pair of rabbets, one on each side of the bolt, a sweep blade for each rabbet having its forward terminal end extending into the rabbet and clamped between the bolt thereof and said cultivator shovel when the bolt is tightened and coacting tongue and groove means within said rabbet to retain said sweep blade against removal from said bracket when the bolt is tight.

5. In combination with a cultivator shovel, a bracket for mounting the same on a cultivator shank, said shovel being bolted against the upper surface of said bracket, and a pair of sweep blades each having a front end positioned between said bracket and said shovel and retained clamped therebetween by the bolt when tightened, said bracket having notches to receive said blades adjacent their front ends.

6. In combination with a cultivator shovel, a bracket for mounting the same on a cultivator shank, said shovel being bolted against the upper surface of said bracket, and a pair of sweep blades each having a front end positioned between said bracket and said shovel and retained clamped therebetween by the bolt when tightened, said forward ends being positioned on opposite sides of the bolt and said bracket having notches to receive said blades adjacent their front ends.

7. In combination with a cultivator shovel, a bracket for mounting the same on a cultivator shank, said shovel being bolted against the upper surface of said bracket, a pair of sweep blades each having a front end positioned between said bracket and said shovel and retained clamped therebetween by the bolt when tightened, said bracket having means coacting with said forward ends to prevent swinging of said sweep blades relative to said bracket while said bolt is tight and said bracket having notches to receive said blades adjacent their front ends.

8. In combination with a cultivator shovel, a bracket for mounting the same on a cultivator shank, said shovel being bolted against the upper surface of said bracket, a pair of sweep blades each having a front end positioned between said bracket and said shovel and retained clamped therebetween by the bolt when tightened, said bracket having a groove in its front face for each sweep blade, said grooves receiving the terminal ends of the sweep blades to retain the blades against removal from between said shovel and bracket when the bolt is tight.

9. In combination with a cultivator shovel, a bracket for mounting the same on a cultivator shank, said shovel being retained against the upper surface of said bracket, said bracket having a pair of other than round sockets in said upper surface and recesses extending from said socket to the side edges of said bracket and a sweep blade for each socket having a portion received and fitting therein and a portion extending therefrom through said recess, said portions being clamped between said shovel and bracket and thus retained in rigid connection therewith.

10. In combination with a cultivator shovel, a member for mounting the same on a cultivator, said shovel being bolted against the upper surface of said member, said member having a pair of other than round sockets in said upper surface and recesses extending from said sockets to the edges of said member and a sweep blade for each socket having a portion received and fitting therein and a portion extending therefrom through said recesses.

11. In combination with a cultivator shovel, a member for mounting the same on a cultivator, said shovel being bolted against the upper surface of said member, said member having a pair of other than round sockets in said upper surface spaced on opposite sides of the bolt and recesses extending from said sockets to the edges of said member and a sweep blade for each socket having a portion received and fitting therein and a portion extending therefrom through said recesses.

12. In combination with a cultivator shovel, a member for mounting the same on a cultivator, said shovel being bolted against the upper surface of said member, said member having a pair of rabbets, one on each side of the bolt and a sweep blade for each rabbet having its forward terminal end extending into the rabbet and clamped between the bolt thereof and the cultivator shovel when the bolt is tightened.

13. In combination with a cultivator shovel, a member for mounting the same on a cultivator, said shovel being bolted against the upper surface of said member, said member having a pair of rabbets, one on each side of the bolt, a sweep blade for each rabbet having its forward terminal end extending into the rabbet and clamped between the bolt thereof and said cultivator shovel when the bolt is tightened and a coacting tongue and groove means within said rabbet to retain said sweep blade against removal from said member when the bolt is tightened.

14. In combination with a cultivator shovel, a member for mounting the same on a cultivator, said shovel being retained against the upper surface of said member, said member having a pair of other than round sockets in said upper surface and recesses extending from said socket to the side edges of said member and a sweep blade for each socket having a portion received and fitting therein and a portion extending therefrom through said recess, said portions being clamped between said shovel and member and thus retained in rigid connection therewith.

PETER O. THOMPSON.